Patented Mar. 10, 1931

1,796,219

UNITED STATES PATENT OFFICE

VICTOR SCHOLZ, OF LEIPZIG-MOLKAU, GERMANY, ASSIGNOR OF ONE-HALF TO THE FIRM ATLAS AGO CHEMISCHE FABRIK AKTIENGESELLSCHAFT, OF MOLKAU, NEAR LEIPZIG, GERMANY

PROCESS OF PREPARING A COMPOSITION OF MATTER

No Drawing. Application filed January 25, 1930, Serial No. 423,565, and in Germany December 29, 1925.

This application is in part a continuation of my application Serial No. 348,974 filed March 21, 1929 in which I have described and claimed a process of treating linseed oil and other oils having one or more unsaturated groups by blowing oxygen therethrough until the oil is converted into a jelly and subsequently kneading oxygen into said jelly until it assumes a fine, crumby, opaque consistency.

It has been found that linoxins prepared with ¼ to 3% or more litharge, linoleate of lead or the like lead-compounds as catalysts, are after a kneading process, very easily soluble in the autoclave at 100–150° C. and at an excess of pressure of 2 to 10 atmospheres, and that these lead-linoxins dissolved in alcohol are, after evaporation of the latter, oils (solution-linoxins) which can be mixed easily and in any proportion with gun-cotton-solutions or celluloid solutions, so that when pigments are added and textures are coated with these mixtures, artificial leather cloth is obtained which, in respect of cold-resistance and quality, is not inferior to ordinary artificial leather usually made of gun-cotton, castor-oil and pigment. At the same time gun-cotton can be loaded with much greater doses of solution-linoxin-oil than of castor oil. The kneading process referred to by me is that described and claimed in my copending application, Serial No. 348,974, and consists in kneading partially oxidized (Taylor) linseed oil in the presence of oxygen until a fine-crumby yellowish product is obtained. In order to manufacture artificial leather out of solution-linoxin-oil, a texture is coated three times with a mixture of:

40 solution-linoxin-oil, plus 20 soot or kaoline, plus 10 gun-cotton (nitro-cellulose) dissolved in: 10 acetic ether, 50 alcohol, and on the top of these soft coatings an outside finishing coat is given to it of e. g.: 25 solution-linoxin-oil, 10 pigment, e. g. leather-brown, 10 nitro-cellulose dissolved in: 10 acetic ether, plus 50 alcohol.

According to the quantity of linoxin-oil used, softer or stiffer coatings can be produced.

Substances of similar composition are suitable for the manufacture of substitute leather for parts of shoes.

If it is intended to produce artificial leather of special softness, the consistent kneaded linoxin, when dissolved in the autoclave with the same or double the quantity of spirit, an addition is made of aniline-oil of ½ to 1% of the weight of the linoxin, or when dissolving the kneaded linoxin in the autoclave with the addition of ½ to 1% of aniline-oil, a quantity of 75% of kneaded linoxin is combined with 25% of fresh castor-oil into combination-oils which do not exude the castor-oil but evidently contain it accumulated, or kneaded linoxin is used which is prepared out of 75% of linseed-oil and 25% of castor-oil and ½% of the mixture of aniline-oil blown together.

If artificial leather is required to be especially nail-hard, the said mixture of nitro-cellulose solution and solution-linoxin-oil may be combined with small quantities of a solution of old-caoutchouc in organic solvents.

Masses consisting of:

90% solution-linoxin-oil, plus 10% gun-cotton, dissolved in: 10 acetic ether, 50 alcohol, will, after evaporation of the solvents in an exhaustible kneading machine, be tenacious and very viscous, so that they can be used for the fixing of linoleum and for other similar purposes.

After evaporation of the gun-cotton solvents, these masses, consisting of 90% solution-linoxin-oil and 10% gun-cotton, keep the nitro-cellulose in clear homogeneous solution in the solution-linoxin-oil, and in warmth these thick-tenacious linoxin-oil-nitro-cellulose solutions are getting soft and thinly liquid without decomposition, so that they can be used for impregnating, currying and finishing of leather, textiles, beltings, etc., and as glutinants for leather and leather-goods, cloth, pasteboard, wood, etc., also as an adhesive for driving-belts, etc.

As described, this linoxin-oil solvent can be combined in any proportion with gun-cotton (nitro-cellulose), and mixtures of 80% of solution-linoxin-oil plus 20% of nitro-cellulose will still yield perfectly dry, cold-resisting films after evaporation of their solvents.

Solution-linoxin-oil is therefore also very suitable for the preparation of elastic nitro-cellulose varnishes, nitro-cellulose colors and nitro-cellulose groundings, also for all kinds of pore-fillers and as a protection against rust and for ship-bottom-paints.

Celluloid-waste, films, or nitro-cellulose in all proportions can thus be combined with the solution-linoxin-oil, and with the aid of pigments and filling materials such articles as: artificial leather, wax-cloth, substitute leather for parts of shoes, nitro-cellulose varnishes, nitro-cellulose paints and groundings, glutinants, impregnating material, dressings, adhesives, book-bindings, wall-papers and -coverings, roofing material, etc., can be manufactured.

Linseed oil is an oil the molecules of which have unsaturated groups. As I have shown in my parent application Serial No. 348,974 hereinabove referred to, other oils having unsaturated groups may be oxidized and polymerized to produce linoxin-like substances. I therefore desire to be understood that when I refer in my claims to linseed oil I intend to include as equivalents of such substance any other oil the molecules of which have unsaturated groups and are referred to as equivalents of linseed oil in said parent application.

Claims:

1. In the process of making a composition of matter consisting of nitrocellulose and linoxyn soluble in a common solvent, the steps of oxidizing and polymerizing the linseed oil in the presence of a lead compound catalyst and by kneading, dissolving the kneaded oil in alcohol with the aid of heat and pressure, then mixing the resulting solution with nitrocellulose.

2. A new composition of matter which comprises a mixture of nitrocellulose and a product resulting from oxidizing and polymerizing linseed oil in the presence of a lead compound catalyst and by kneading, dissolving the kneaded oil in alcohol with the aid of heat and pressure and evaporating the alcohol.

In testimony whereof I have signed my name to this specification.

VICTOR SCHOLZ.